US006615231B1

(12) United States Patent
Deen et al.

(10) Patent No.: US 6,615,231 B1
(45) Date of Patent: Sep. 2, 2003

(54) SYSTEM AND METHOD FOR DIRECTING REQUESTS TO SPECIFIC PROCESSING

(75) Inventors: Brian J. Deen, North Bend, WA (US); Van C. Van, Kirkland, WA (US); Henry L. Sanders, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/464,340

(22) Filed: Dec. 15, 1999

(51) Int. Cl.[7] .............................................. G06R 15/15
(52) U.S. Cl. ........................ 709/201; 709/200; 709/203; 709/212; 709/216; 709/227; 709/229; 709/104
(58) Field of Search ................................ 709/100, 101, 709/102, 104, 200, 201, 202, 203, 217, 218, 219, 220, 227, 228, 212, 216; 707/1, 8, 10

(56) References Cited

U.S. PATENT DOCUMENTS

| 4,644,468 | A | * | 2/1987 | Doster et al. ............... 709/220 |
| 5,551,046 | A | * | 8/1996 | Mohan et al. ................. 707/8 |
| 5,732,219 | A | * | 3/1998 | Blumer et al. .............. 709/227 |
| 5,862,325 | A | * | 1/1999 | Reed et al. ................. 709/201 |
| 6,088,717 | A | * | 7/2000 | Reed et al. ................. 709/201 |
| 6,112,304 | A | * | 8/2000 | Clauson ...................... 713/156 |
| 6,131,095 | A | * | 10/2000 | Low et al. .................... 707/10 |
| 6,151,624 | A | * | 11/2000 | Teare et al. ................. 709/217 |
| 6,173,311 | B1 | * | 1/2001 | Hassett et al. ............. 709/202 |
| 6,246,758 | B1 | * | 6/2001 | Low et al. ................... 379/230 |
| 6,272,523 | B1 | * | 8/2001 | Factor ........................ 709/201 |
| 6,282,281 | B1 | * | 8/2001 | Low ............................ 379/230 |
| 6,338,082 | B1 | * | 1/2002 | Schneider .................... 709/203 |
| 6,345,288 | B1 | * | 2/2002 | Reed et al. ................. 709/201 |
| 6,366,947 | B1 | * | 4/2002 | Kavner ........................ 709/203 |
| 6,464,139 | B1 | * | 10/2002 | Wilz et al. ............. 235/462.01 |
| 6,466,570 | B1 | * | 10/2002 | Low et al. ................... 370/352 |

OTHER PUBLICATIONS

Fielding et al., RFC 2068, "Hypertext Transfer Protocol—HTTP/1.1", Jan. 1997.
Goland et al., RFC 2518, "HTTP Extensions for Distributed Authoring—WEBDAV", Feb. 1999.

* cited by examiner

Primary Examiner—Majid A. Banankhah
(74) Attorney, Agent, or Firm—Workman, Nydegger & Seley

(57) ABSTRACT

The present invention provides for directing requests to specific processing using an inclusion list. The inclusion list contains a list of methods that an associated process, program, or module is capable of executing. A request contains at least a method and a resource. A server, upon receiving the request, identifies the process module or handler that is associated with the resource by the file extension of the resource. After the process is identified, an inclusion list is examined to determine if the process is capable of performing the identified method. If the method is listed in the inclusion list, then processing is directed to the identified process, which performs the indicated method with regard to the identified resource. If the method is not listed in the inclusion list, then control of the request is not provided to the process. In the case where the inclusion list is empty, processing is directed to the process associated with the extension of the resource regardless of the method specified in the request.

26 Claims, 2 Drawing Sheets

SYSTEM AND METHOD FOR DIRECTING REQUESTS TO SPECIFIC PROCESSING

BACKGROUND OF THE INVENTION

1. The Field of the Invention

The present invention relates to systems and methods for directing requests to specific processing. More particularly, the present invention relates to systems and methods for directing Hyper Text Transport Protocol (HTTP) requests to specific processing using mapping techniques.

2. The Prior State of the Art

The rapid and effective exchange of information can generate many positive societal results such as improved education, an efficient economy and stronger personal relationships. In the modem era often termed the "information age," computer networks such as the Internet play an important role in facilitating such information exchange. For example, e-mail allows people to communicate quickly over large distances and at minimal cost. Furthermore, the Internet and World-Wide Web allow users to manipulate browser software to obtain information in the form of World-Wide Web pages that may reside on one of millions of remote servers. Currently, there are so many World-Wide Web pages, that computer users can access information concerning practically any subject matter they desire. Computer networks also allow people to share resources such as memory or processing power.

Many conventional computer networks exchange information using a request-response protocol. Specifically, a client computer obtains information by generating a request and transmitting that request over a computer network to a server computer. The server computer interprets and generates a response to the request which ideally includes the information requested by the client computer. HyperText Transport Protocol or HTTP is one example of a request-response protocol that is used over computer networks.

In larger networks such as the Internet, a server computer can potentially receive many requests from many different client computers. Thus, it is important that the server computer respond efficiently to each request. Furthermore, to preserve the integrity and utility of the network, the server computer should respond appropriately to the request by considering the information desired and the security permissions of those generating the request. In some cases this may involve responding within the desired information. In other cases, this may involve responding with an error message if the user does not have security permission to obtain the desired information.

A server computer, or a cluster of server computers, may have available several specialized software modules that can efficiently handle requests for information of certain types or perform other processing such as executing code. For example, a special "active server" module may be capable of responding to a request identifying an active server page. An active server page is a Web page that contains executable code that is typically executed in response to a request for the active server page. An active server page is identified by an "asp" extension. Typically, the results of the execution rather than the executable code itself are then included in the response to the client.

The server computer must thus make a determination as to whether the module can handle the request identifying a file, page, or other resource. In the case of the "active server" module, the server would ensure that the request truly identifies an active server page by, for example, confirming that the request identified a file with an "asp" extension.

The server computer must also confirm that the module can perform the command or "verb" designated in the request on the file. For example, an active server module typically does not handle the HTTP methods "PUT" or "DELETE", but can handle other HTTP methods such as "GET", "POST" and "HEAD". Thus, it is important that the server computer not pass control for processing the request to the active server module when the request designates methods that the active server module does not handle or is not capable of executing. For example, the server computer should not pass control for processing the request to an active server module if the request includes the methods "PUT" or "DELETE".

The server computer performs this method check by using a mapping technique referred to as an exclusion list, which includes a list of all the methods that the module does not handle. In the active server module example, the exclusion list would include an entry for the active server module with corresponding methods "PUT" and "DELETE" indicating that the active server module does not handle the "PUT" and "DELETE" methods. On the other hand, since the methods "GET", "POST" and "HEAD" are not included on the exclusion list, control is properly passed to the active server module when the request includes those methods. The methods within the exclusion list may have been derived based on information provided by the module to the server computer as the module registers with the exclusion list during installation of the module or power up of the server computer.

The problem with the exclusion list stems from the fact that many transport protocols are extensible protocols in that additional methods can be introduced into the protocol. For example, HTTP is an extensible protocol for which further extensions have been developed. WEB Distributed Authoring and Versioning or WEBDAV is one such extension that introduces new methods that permit collaborative and distributed authoring over the Internet. Some of these new WEBDAV methods include, for example, "PROPFIND", "PROPPATCH", "MKCOL", "COPY", "MOVE", "LOCK" and "UNLOCK."

However, assume that these new methods are not known to the module developers at the time the module is distributed. This might likely occur if the new methods were introduced into a protocol after the module was distributed. In this case, the module does not register with the server computer that the module cannot handle these new methods and thus the new methods will not be included within the exclusion list. After all, the developers might have a very difficult time predicting what potential new methods could appear within a request for future extensions to the protocol. Thus, the developers cannot have the module register with the exclusion list such new methods with the exclusion list as being methods that the module cannot handle.

If the server computer receives a request designating a new method, the server computer would check the exclusion list to discover that the new method is not listed as one of the methods that the module cannot handle. Thus, control would be passed to the module to process the request. The module most likely will not be able to perform the new method since the assumption is that the module was distributed before the new method was known to the developers of the module.

Thus, the module could return an unpredictable and inappropriate response to the request thereby introducing inefficiency into the server computer's ability to properly process a request. Therefore, methods and systems are desired for conditionally passing control for processing a request to a module. Control should not be passed to the module if the module cannot handle a method included in the request even if the method was not known to the module developers.

SUMMARY OF THE INVENTION

In many networks, including Intranets and the Internet, the exchange of information between clients and servers is often initiated by a request from a client. The request typically identifies a resource and a particular method that is to be performed at the server with regard to the identified resource. For instance, the method may be a GET method, which causes the server to retrieve the identified resource for the client. The resource is typically identified by a name and an extension.

At the server, the extension is usually associated with specific processing in the form of a process, program or other module, that will be executed in response to the request. This is performed by transferring or directing control of the request to the specific processing. The act of providing control to another process is complicated by the fact that some of the processes, programs or modules that will execute the method identified in the request are not able to perform or execute all of the potential methods that may be included in requests.

To overcome this problem, the present invention provides an inclusion list that is associated with the resource and the associated process that includes a list of the methods that the process is capable of executing. The server receiving the request examines the inclusion list and if the method identified in the request is present or included in the inclusion list, then processing of the request is directed to the corresponding process. If the method is not listed in the inclusion list, then the corresponding process is not given control of the request and the client is appropriately notified.

The present invention provides for a known response in the event that the method included in the request is not listed in the inclusion list. Further, an inclusion list is easily updated and will continue to operate effectively as new and currently unknown methods are developed. In the special case where the inclusion list is empty, the server always transfers control of the request to the process because an empty inclusion list is interpreted as being able to handle all methods.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawing depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
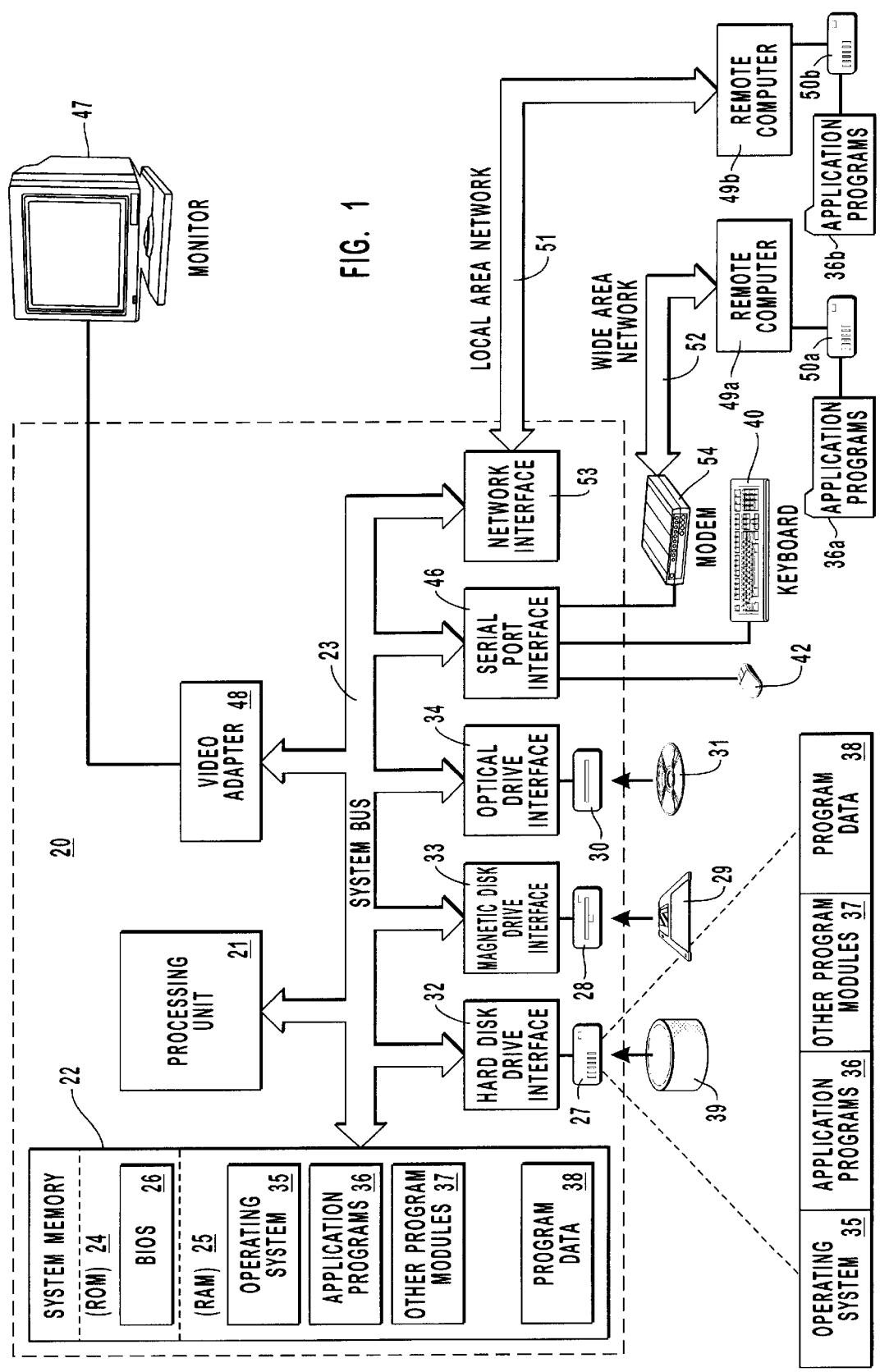
FIG. 1 illustrates an exemplary system that provides a suitable operating environment for the present invention.

In a typical operating system on an isolated computer, different files are typically associated with different processes, programs or other computer modules. A command to open or use a particular file causes the associated process or program to execute or run the file. In many instances, this association is dependent on the file extension. For example, Graphics Interchange Format (GIF) files have a "gif" extension and many computers have a program or process that is capable of opening the GIF file and causing it to be displayed on a screen. When an attempt to open or use the GIF file is made by a user, the associated program or process executes thereby opening the file that is being used. A similar process may occur over networks such as the Internet.

There are several differences, however, between a network and a single computer. In an operating system on a single computer, the only method for accessing a file is with an OPEN request. In a network, a file or resource can be accessed, for example, with a GET, POST or other HTTP request. Thus, the remaining issue is determining whether the program or process associated with the file extension is capable of performing the request. As described previously, this was conventionally accomplished using an exclusion list. If the request was not excluded by the exclusion list, then the program or process associated with the file extension of the requested resource was executed. If the request was excluded by the exclusion list, then the associated program or process was not executed and in many instances, an error message was returned.

The present invention provides "inclusion" lists which provides significant advantages not available with an exclusion list. An inclusion list includes the commands, methods or verbs that can be executed by the program or process associated with the requested resource. HTTP and WEDDAV, in particular, are extensible, which indicates that currently unknown commands or verbs may be developed in the future. This unknown aspect is important because when a new verb is developed, an exclusion list does not exclude it and the associated process will therefore attempt to execute the new request, which will produce unknown results. An inclusion list, on the other hand, avoids this potential error because the process or program associated with the requested resource will not be allowed to execute the request, and it is possible to update the inclusion list such that future request can be executed. An inclusion list is an example of a technique for mapping a request to specific processing.

The invention is described below by using diagrams to illustrate either the structure or processing of embodiments used to implement the systems and methods of the present invention. Using the diagrams in this manner to present the invention should not be construed as limiting of its scope.

The present invention contemplates both methods and systems for directing HTTP requests to specific processing using inclusion lists. The embodiments of the present invention may comprise a special purpose or general purpose computer including various computer hardware, as discussed in greater detail below.

Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically includes many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

As used herein, a resource refers to computer readable media, programs, processes, threads, applications, memory, printing devices, networks, network connections, files, folders, directories, input/output devices, ports, documents, spreadsheets, operating systems, and more. In other embodiments, resource may refer only to data or files stored on computer readable media. Resources that are stored on computer readable media are frequently categorized according to a type, which is often done with the use of a file extension. A file extension is usually separated from the resource name by a period and can have up to three letters or digits. For example, the extension "ASP" refers to a Web page that contains programming code, and the extension "DLL" refers to a dynamic link library, which is an executable module that performs some function. A dynamic link library file is not called by a user, but is invoked by a currently executing application to perform a specific function.

As previously described, HTTP is an extensible protocol and WEBDAV is an extension of HTTP that introduces new methods, in addition to the methods provided by HTTP, which permit collaborative and distributed authoring over a network such as the Internet. When a request is made using a WEBDAV or other methods, at least the method and the resource are identified in the request. Thus a request comprises at least a method and a resource. In some instances, a method is referred to as a verb because it indicates the action to be taken with regard to the specified resource. For example, the request of "GET foo.asp" is a request where the verb or method is "GET" and the resource is "foo.asp." In practice, a request will usually comprise additional information, including headers, as required by HTTP or other protocol.

Figure 2:
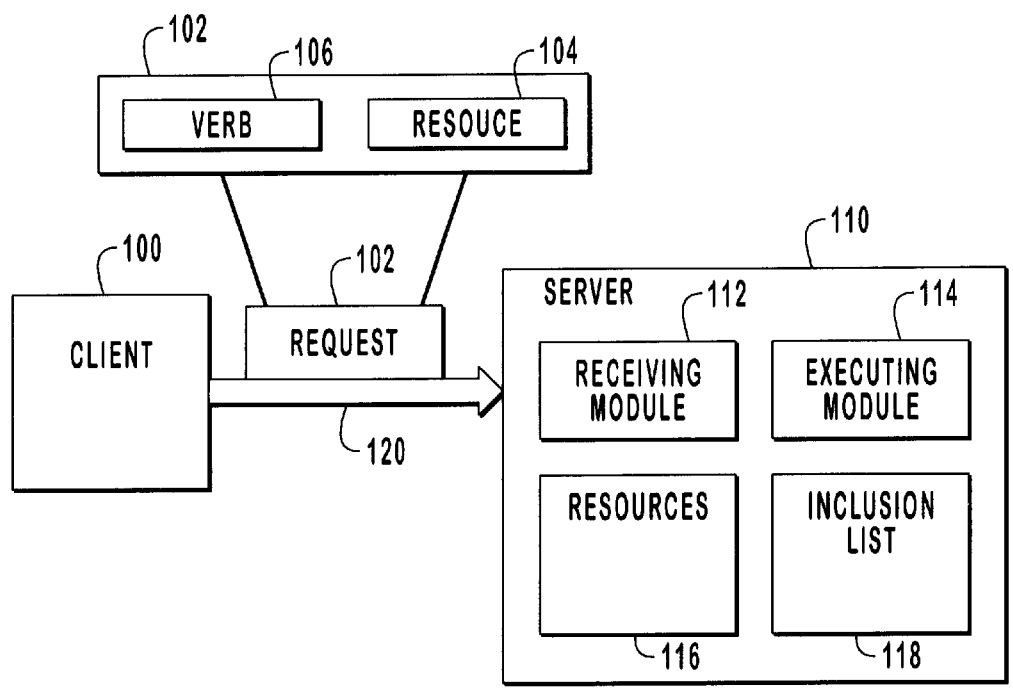
FIG. 2 is a block diagram illustrating a request from a client to a server having modules for processing the request.

FIG. 2 is a block diagram illustrating a system that illustrates the use of an inclusion list when directing an HTTP request to specific processing. Client 100 is a computer that is connected to server 110 via network connection 120. Network connection 120 may be an Intranet connection, an Internet connection or other connection that permits client 120 to communicate with server 110. Request 102 initiates, in this example, with client 100 and is transmitted to server 110. The transmission of request 102 is in accordance with the request-response protocol that connects server 110 with client 100, which may be HTTP or File Transfer Protocol (FTP), or other protocol.

Request 102 comprises verb 106 and resource 104. Verb 106 is a method, in this example, defined by HTTP or other extensions of HTTP such as WEBDAV. Resource 104 contained in request 102 is located in resources 116 of server 110, and the resource 104 is usually identified by a file extension appended to a file name. Request 102 is received by server 110, which is able to determine which process or module is capable of processing request 102 by examining the extension of resource 104. Alternatively, server 110 may have receiving module 112, which is a module or handler that is capable of receiving and processing requests. More generally, however, request 102 is received by server 110.

In this example, executing module 114 is associated with resources having the file extension of resource 104 in request 102. After executing module 114 has been determined by server 110, inclusion list 118 is examined by server 110 to determine whether executing module 114 is capable of performing verb 106. Inclusion list 118 essentially contains a list of verbs or methods that can be executed by executing module 114. If verb 106 is not present in inclusion list 118, which is also associated with resource 104, then executing module 118 will not be given control for processing request 102 by server 110. Client 100 is notified by server 110 that request 102 cannot be performed by server 110 by an error message or other method. If verb 106 is present in inclusion list 118, then executing module 114 handles the execution of request 102. Executing module 114 is an example of a process, program, handler or other entity that is capable of executing or processing request 102.

For example, if request 102 was "COPY foo.asp," then verb 106 is COPY and resource 104 is foo.asp. Further assume that executing module 114 is "asp.dll" and that the verbs contained in inclusion list 118, which is associated with resource 104 and executing module 114, are: GET, COPY and MOVE. In this instance, server 110 receives request 102 and determines that the verb COPY is included in inclusion list 118 and control of request 102 is directed or provided to asp.dll. The data returned to client 100 consists of the results of the execution of asp.dll in this instance.

A special case to consider is when inclusion list 118 does not contain any verbs or methods. An empty inclusion list may, as desired, be interpreted as including all verbs or methods. In other words, executing module 114 will handle all requests 102 for a resource associated with an empty inclusion list. Inclusion list 118 is metadata, or data about resources 116, and may be stored, for example in a metabase of server 110, the metabase being a meta data store. As a result, it is possible to update the inclusion list 118 associated with each resource or executing module 114 of server 110. Usually, each executing module 114 has its own inclusion list, or at least an entry in an inclusion list. It is understood that server 110 most likely has more than one executing modules 114.

FIG. 2 has been described in terms of a client computer connected with a server computer over the Internet or an Intranet, but it is understood that the systems and methods of the present invention apply to other configurations. For example, a MOVE or COPY verb are capable of being executed on an isolated client computer or on an isolated server computer. Preferably, the systems and methods described herein are applied to configurations as described in FIG. 2.

Figure 3:
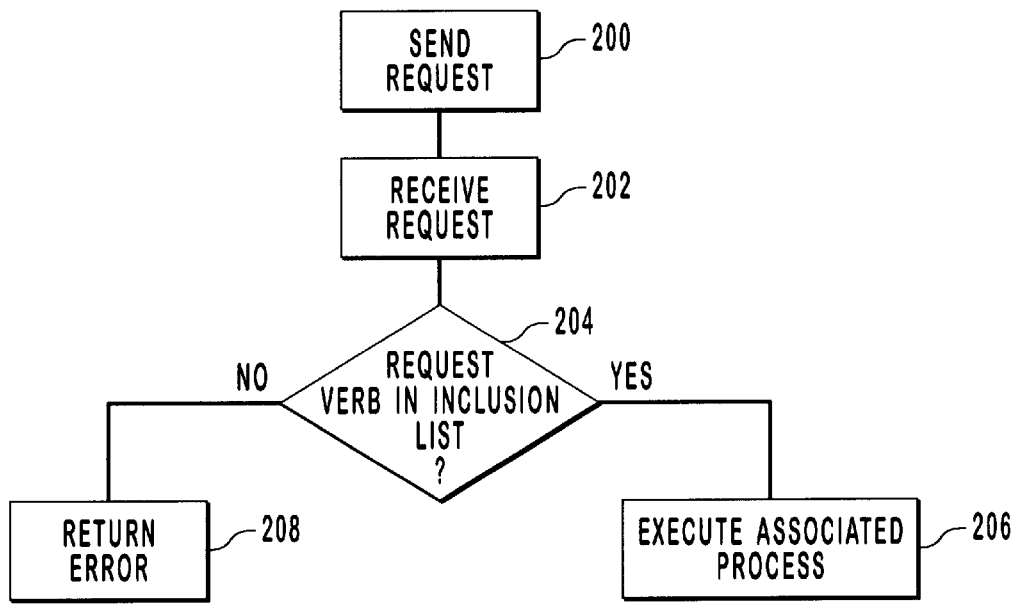
FIG. 3 is a flowchart illustrating exemplary steps for directing a HTTP request to specific processing.

FIG. 3 is a flowchart illustrating an exemplary method for directing the processing of an HTTP, WEBDAV, or other request to specific processing. In step 200, a request is formulated by a user or client and sent over a network connection to a server. In step 202, the request is received by the destination server. The destination server examines the request and is able to identify a program or process that is associated with the resource identified in the request. The program or process associated with the resource is usually identified by the extension of the resource. The association of the extension with a process or program exists at the server computer and is usually not known to the client sending the request.

After the request is received and the resource and the associated process have been identified, the inclusion list associated with the requested resource and associated process is examined to determine whether the associated process is capable of handling the request in step 204. If the verb or method in the request cannot be handled by the associated process, then an error is returned in step 208. Alternatively, the server may simply ignore the request, notify the client that the request cannot be performed, or perform any other suitable response in step 208.

If the verb is included in the inclusion list, then the processing of the request is directed to the associated process or program for execution in step 206. The associated process takes the request and performs the verb. After the verb has been executed, the results of the execution are returned to the client or user. For example, a resource that has an "asp" extension contains embedded code and when a client issued a GET command to the server for the "asp" resource, the code in the file is executed and the results of that execution are returned to the client, rather than the actual "asp" resource.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computer having the ability to receive requests and having access to an executing module, a method for conditionally passing control for processing a request from the computer to the executing module, the method comprising the acts of:

receiving a request indicating a verb;

determining, based on information in the request, whether the executing module is to handle processing the request by referring to an inclusion list that includes a list of verbs that the executing module is capable of handling; and passing control for processing the request to the executing module if the verb indicated in the request is included in the inclusion list.

2. A method as defined in claim 1, wherein the request comprises a resource having a name and an extension.

3. A method as defined in claim 1, wherein the act of determining further comprises the act of identifying the executing module associated with a resource in the request.

4. A method as defined in claim 1, wherein the act of passing control for processing further comprises the act of giving control for processing the request to the executing module if the inclusion list is empty.

5. A method as defined in claim 1, further comprising the acts of:

executing the executing module; and returning the results of the execution.

6. A method as defined in claim 1, further comprising the act of refraining from passing control for processing the request to the executing module if the verb indicated in the request is not included in the inclusion list and the inclusion list is not empty.

7. In a system having a server capable of receiving requests from a client, the requests having a verb and a resource, a method for directing the request to specific processing, the method comprising the steps of:

identifying, by the server, the specific processing associated with the resource contained in the request;

determining if the verb contained in the request is included in an inclusion list associated with the specific processing; and providing, by the server, control of the request to the specific processing only if the verb is included in the inclusion list.

8. A method as defined in claim 7, wherein the step of identifying further comprises examining an extension of the resource.

9. A method as defined in claim 7, wherein the specific processing is executable.

10. A method as defined in claim 7, wherein the inclusion list is metadata stored in a metabase.

11. A method as defined in claim 7, further comprising the steps of:

executing the specific processing; and returning results of the execution to the client.

12. A method as defined in claim 7, wherein the step of providing further comprises the step of giving control of the request to the specific processing if the inclusion list is empty.

13. A method as defined in claim 7, further comprising the step of refraining from providing control of the request to the specific processing if the verb is not included in the inclusion list and the inclusion list is not empty.

14. In a server capable of receiving requests following a protocol, a method for directing control of the resource to an executing module, comprising:

the act of receiving the request at the server, the request having a verb and a resource, wherein the resource comprises a name and an extension;

the act of associating the request with the executing module based on the extension of the resource;

the act of comparing, by the server, the verb with a list of verbs contained in an inclusion list associated with the executing module and the extension; and the act of executing, by the executing module, the request if the verb is included in the inclusion list.

15. A method as defined in claim 14, wherein the inclusion list is metadata stored in a metabase of the server.

16. A method as defined in claim 14, further comprising the act of returning, by the server, results of the execution performed by the executing module.

17. A method as defined in claim 14, further comprising the act of executing, by the executing module, the request if the inclusion list is empty.

18. A method as defined in claim 14, further comprising the act of refraining from directing control of the request to the executing module if the verb is not included in the inclusion list and the inclusion list is not empty.

19. A method as defined in claim 14, wherein the association between the extension and the executing module is unknown to an entity generating the request.

20. A computer program product for implementing, in a system having a server capable of receiving requests from a client, the requests having a verb and a resource, a method for directing the request to specific processing associated with the request, the computer program product comprising:

a computer readable medium carrying computer executable instructions for implementing the method, the computer executable instructions, when executed, performing the acts of:

identifying, by the server, the specific processing associated with the resource contained in the request;

determining if the verb contained in the request is contained in an inclusion list associated with the specific processing; and providing, by the server, control of the request to the specific processing only if the verb is included in the inclusion list.

21. A computer program product as defined in claim 20, wherein the computer readable medium further carries computer executable instructions for performing the act of identifying further comprises examining an extension of the resource such that the specific processing associated with the extension may be identified.

22. A computer program product as defined in claim 20, wherein the specific processing is executable.

23. A computer program product as defined in claim 20, wherein the inclusion list is metadata stored in a metabase.

24. A computer program product as defined in claim 20, wherein the computer readable medium further comprises computer executable instructions for performing the acts of:

executing the specific processing; and returning results of the execution to the client.

25. A computer program product as defined in claim 20, wherein the computer executable instructions for performing the act of providing further comprises computer executable instructions for performing the act of giving control of the request to the specific processing if the inclusion list is empty.

26. A computer program product as defined in claim 20, wherein the computer readable medium further carries computer executable instructions for performing the act of refraining from providing control of the request to the specific processing if the verb is not included in the inclusion list and the inclusion list is not empty.

* * * * *

UNITED STATES PATENT AND TRADEMARK OFFICE
CERTIFICATE OF CORRECTION

PATENT NO.    : 6,615,231 B1
DATED         : September 2, 2003
INVENTOR(S)   : Deen et al.

It is certified that error appears in the above-identified patent and that said Letters Patent is hereby corrected as shown below:

Column 1,
Line 17, after "In the" please delete "modem" and insert -- modern --

Column 3,
Line 66, after "that these" please delete "drawing" and insert -- drawings --

Column 4,
Line 50, before "in particular" please delete "WEDDAV," and insert -- WEBDAV, --

Signed and Sealed this

Twenty-ninth Day of June, 2004

JON W. DUDAS
*Acting Director of the United States Patent and Trademark Office*